Figure 7A:
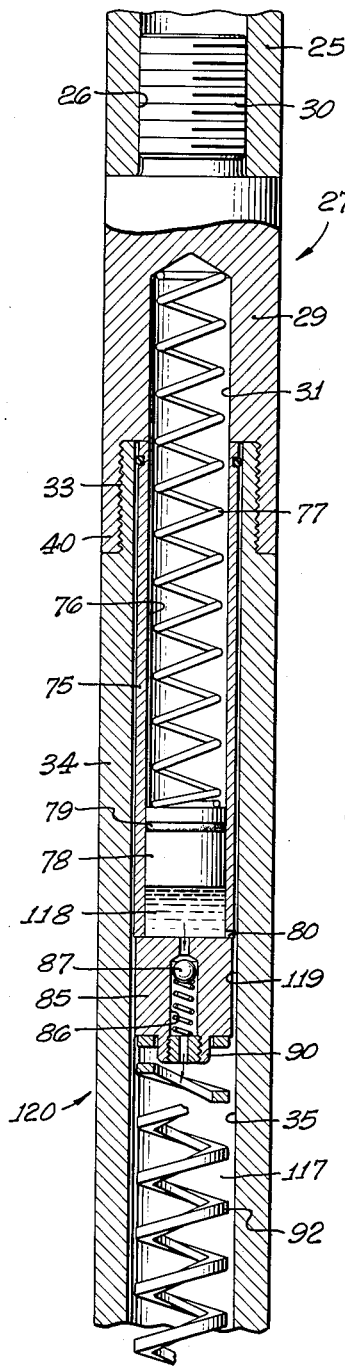

Nov. 23, 1965   W. N. SUTLIFF   3,219,373
ROD COUPLER
Filed March 25, 1963   3 Sheets-Sheet 1
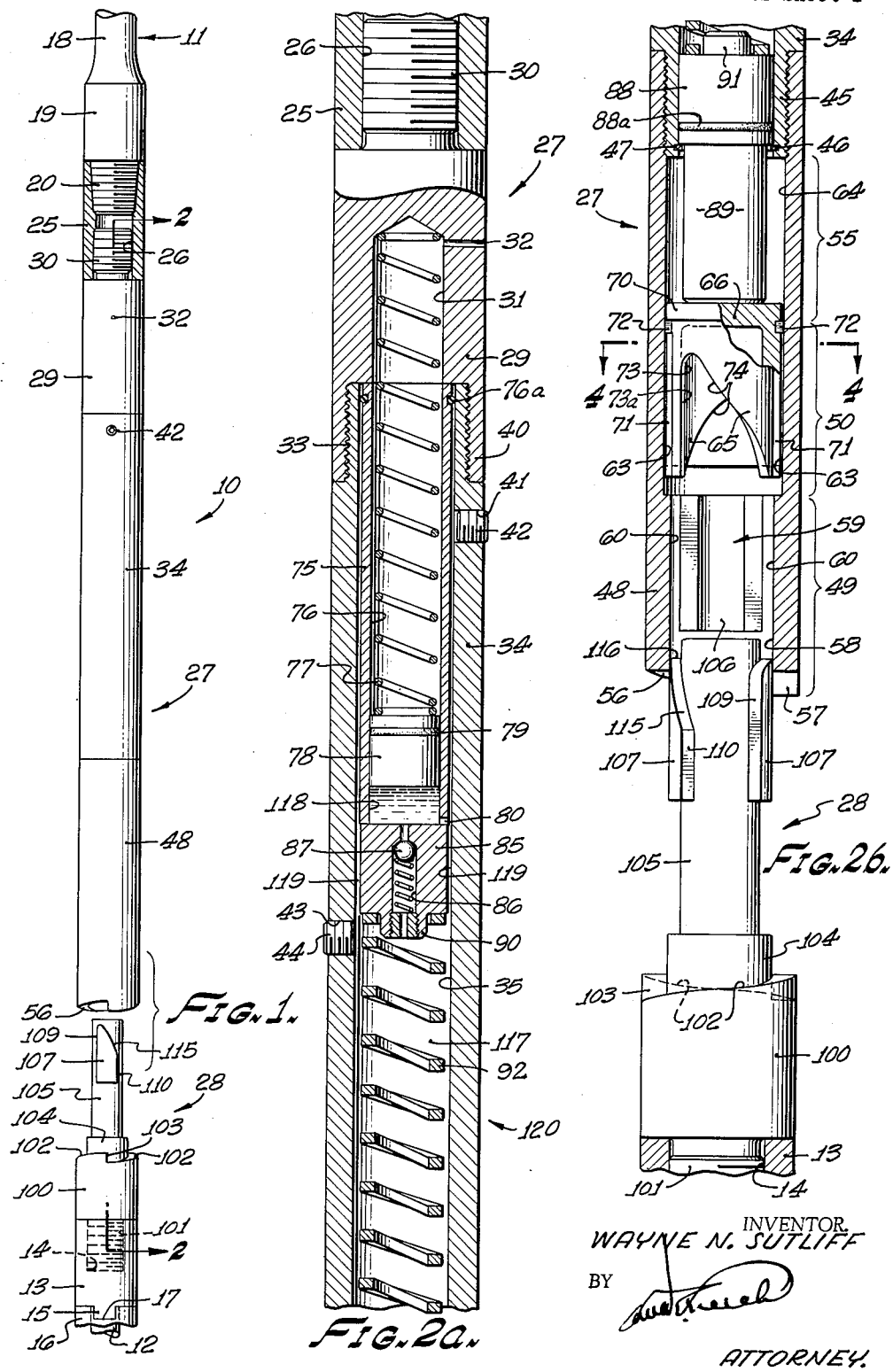
INVENTOR
WAYNE N. SUTLIFF
BY 
ATTORNEY

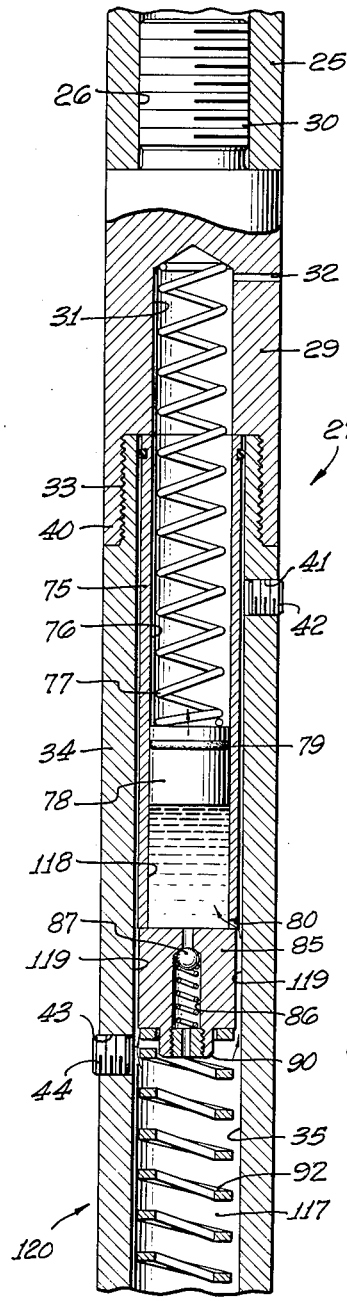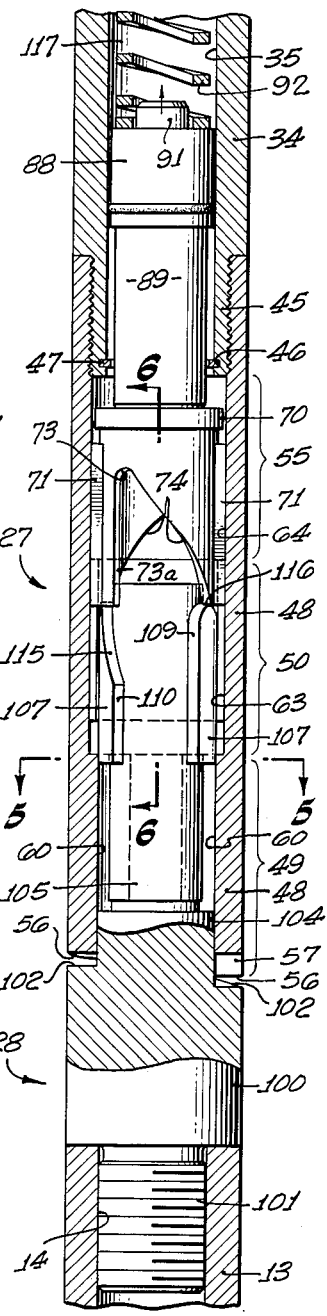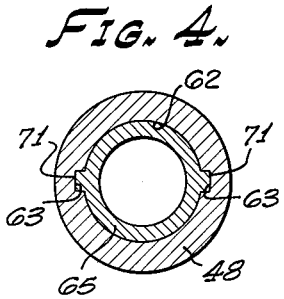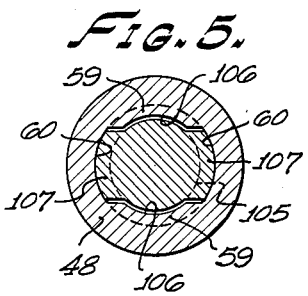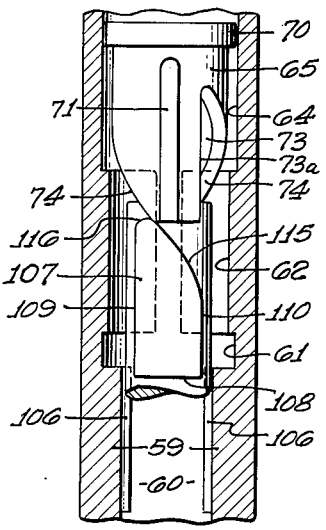

Nov. 23, 1965

W. N. SUTLIFF 3,219,373

ROD COUPLER

Filed March 25, 1963

3 Sheets-Sheet 3

INVENTOR.
WAYNE N. SUTLIFF
BY
ATTORNEY.

United States Patent Office 3,219,373
Patented Nov. 23, 1965

1

3,219,373
ROD COUPLER
Wayne N. Sutliff, 2931 Pierce Road, Bakersfield, Calif.
Filed Mar. 25, 1963, Ser. No. 267,573
9 Claims. (Cl. 287—103)

This invention relates to devices for coupling together axially aligned rods and is particularly useful for coupling together the lower end of a string of sucker rods with the plunger rod of a deep well reciprocating pump.

It is an object of the present invention to provide a novel rod coupler which is adapted to perform its function in response to the application of a substantial pressure shifting one of said rods axially towards the other.

Another object of the invention is to provide such a rod coupler which will produce a coupling between two aligned rods as aforesaid which will be substantially free of end play.

A further object of the invention is to provide such a rod coupler which may be uncoupled at will by holding one of said rods against rotation and applying a substantial degree of torque to the other of said rods but which is self-restored to fully coupled condition if the application of said torque is sustained for less than a predetermined period of time.

Yet another object of the invention is to provide such a rod coupler which requires less than a single revolution of one of said rods relative to the other by the application of torque as aforesaid to disconnect said coupler but which is provided with means retarding said rotation of one of said rods relative to the other to effect such an uncoupling for a relatively long period of time so that accidental application of torque to one of said rods relative to the other while rotation of the other rod is prevented and which would necessarily be for a relative short period of time, may not cause the accidental separation of said coupler.

The present invention has a special utility in a deep well for coupling the lower end of a string of sucker rods to the plunger of a deep well reciprocating pump and then disconnecting said coupler at will by manipulating said sucker rod string at the top of the well.

The function of a rod coupler in a deep well is to permit the sucker rod string to be assembled and run down the pump tubing string after the assembly of the latter and likewise, to permit the rod string to be removed entirely from the tubing string before starting to pull and disassemble the latter.

It is thus still another object of the invention to provide such a rod coupler which requires, for uncoupling the same, the application of torque to the rod string over a period substantially in excess of the maximum period that a substantial torque may be applied to said rod string accidently, whereby any torque applied accidently to the rod string will not uncouple the rod string from the pump plunger.

A yet further object of the invention is to prevent a cumulative response by the rod coupler to successive applications of torque to the rod string by providing means for rapidly restoring the coupler to normal coupled condition whenever the rod string is released from a temporary application of torque thereto which may have started to uncouple the coupler.

Still another object of the invention is to provide a rod coupler embodying a dashpot restraining the mechanism

2 of the coupler for a substantial period of time from functioning either to couple or uncouple the rod string and which may be actuated to couple the rod string by applying the weight of the latter downward upon the coupler throughout said time period and which requires an application of relatively high torque to said rod string through a corresponding period of time in order to uncouple the rod string from the pump plunger.

Another object of the invention is to provide such a rod coupler which automatically snugs the connection made thereby so there is no endwise play therein while the rod string remains coupled to the pump plunger.

The manner of accomplishing the foregoing objects as well as further objects and advantages will be made manifest in the following description taken in connection with the accompanying drawings in which FIG. 1 is a diagrammatic elevational view (partly in section) of a preferred embodiment of the coupler of the present invention with the tubular body and pin members of the coupler juxtaposed in alignment with each other in readiness to be locked together to couple the lower end of a sucker rod string with the valve plunger rod of a deep well pump.

FIG. 2 is an enlarged vertical sectional view taken on the line 2—2 of FIG. 1 and is divided into two parts separately designated in the drawings as FIGS. 2a and 2b, this view showing the tubular body of said coupler in a lower position than that in which it is shown in FIG. 1 whereby the lower end of said tubular body has slidably received therein the upper end of said pin member of the coupler with the diametrically opposed lugs of said pin member aligned with the splineways within said tubular body for slidably receiving said lugs so that the latter will bypass internal bosses provided within an initial section of said body member.

FIG. 3 is a view similar to FIG. 2 and is also divided into two parts separately identified as FIGS. 3a and 3b, and shows the tubular body member of the coupler advanced still further downwardly on the pin member of the coupler but with the lugs of said pin member still occupying upper portions of said splineways in the initial section of said body member, this view also illustrating the functioning of the dashpot of the invention to substantially retard the axial movement of said body member relative to said pin member so that a considerable period of time is consumed by this movement before the final assembly of said coupler can be effected to rigidly couple together said sucker rod string and said plunger valve rod.

FIG. 4 is a horizontal sectional view taken on the line 4—4 of FIG. 2b and illustrates the diameter of the bore provided in the second section of said coupler body member and the cross section of the area in said bore occupied by the sleeve cam of the invention and also shows the spline connection of said sleeve cam with said second body section.

FIG. 5 is a horizontal sectional view taken on the line 5—5 of FIG. 3b and illustrates the cross sectional contour of the pin member and its lugs as well as the cross sectional contour of the internal bosses formed within the initial section of the body member of the coupler and of the splineways formed in said initial section between said bosses for slidably axially receiving said lugs so that the latter may bypass said bosses when said tubular body member slips downwardly over said pin member as shown in FIG. 3b.

FIG. 6 is a fragmentary vertical sectional view taken on the line 6—6 of FIG. 3b and shows how the rounded upper ends of said lugs engage the extreme lower end portions of the helical cam faces provided on said cam sleeve during the penetration of said tubular body member by said pin member up to the point illustrated in FIG. 3b.

Figure 7B:
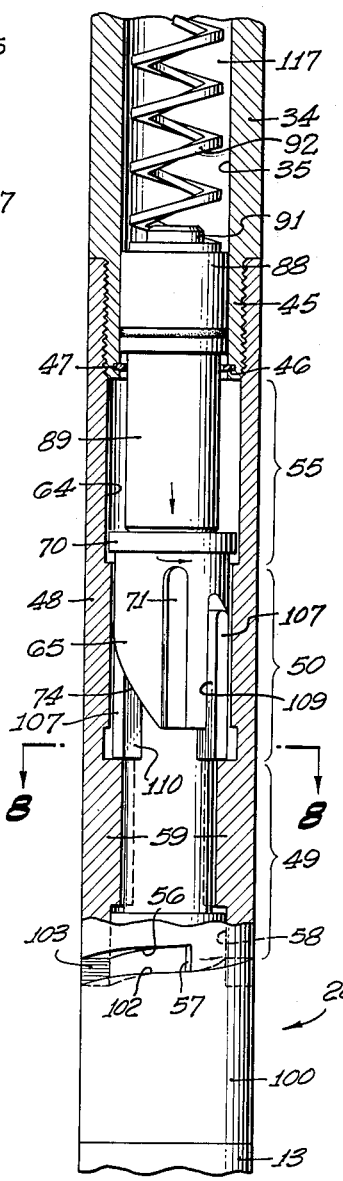

FIG. 7 is a view similar to FIG. 3 and is drawn in two parts separately designated as FIGS. 7a and 7b and is taken in the same plane as FIG. 6 to illustrate the relation of the parts of the invention at the consummation of the operation of forming a union between the pin member and tubular body member of the coupler of the invention. The lugs are here shown entirely above the aforesaid internal bosses and the pin is shown as having been rotated, by engagement of the cam sleeve with said lugs, slightly over 90° and with the pin member locked in that position relative to the tubular body member and with said lugs snugged against said bosses by engagement of helical cam faces provided on the lower end of said tubular body member and the base of said pin member.

Figure 8:
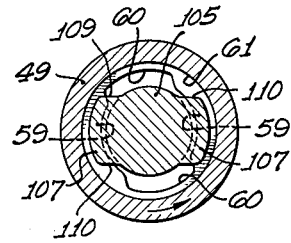

FIG. 8 is a horizontal sectional view taken on the line 8—8 of FIG. 7b and shows the rotational relationship of the pin member and tubular body member of the coupler of the invention as these are in interlocked relationship as shown in FIG. 7. The arrow in this view indicates the direction of rotation of the body member relative to the pin member in the final phase of the interlocking of these two members of the coupling. This view also clearly shows the location of the lugs of the pin member correctly over the internal bosses of the body member which unites these two members against axial separation when they are interlocked.

Figure 9:
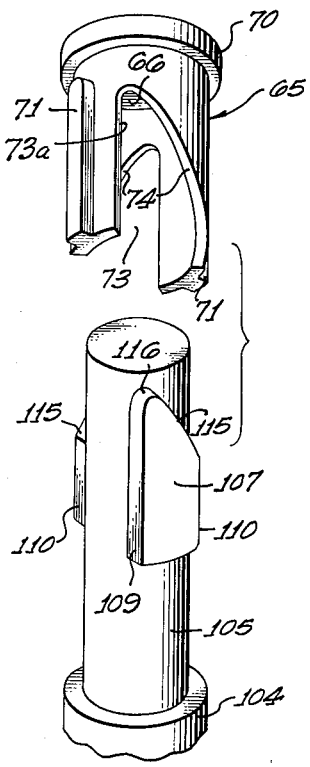

FIG. 9 is a diagrammatic prespective view of the pin member and cam sleeve of the invention with these axially separated but rotationally related as when the union of the pin and body members of the coupler has been effected as shown in FIG. 7.

Referring specifically to the drawings, the invention is there illustrated as a rod coupler 10 used for connecting the lower end of a sucker rod string 11 and a plunger valve rod 12. The latter rod has a rod coupling 13 secured on its upper end said coupling having a right-hand threaded receptacle 14 in its upper end, said coupling also having diametrically opposed clutch lugs 15 extending downwardly therefrom. The rod 12 is guided vertically by a rod valve guide 16 which is fixed in the upper end of a deep well pump (not shown) and said rod extends downwardly into said pump to connect with the plunger thereof. Formed diametrically in the upper end of the guide 16 are clutch notches 17 into which the lugs 15 are adapted to fit when the coupling 13 is allowed to drop downwardly onto the guide 16 thus locking the rod coupling 13 against rotation relative to said pump.

The sucker rod string 11 includes a series of interconnected individual sucker rods 18 the lower end of the lower-most sucker rod in the string being shown in FIG. 1 as including a sucker rod head 19 having a right-hand threaded pin 20 onto which a special coupling 25 is screwed. This coupling has a right-hand threaded bore 26 in its lower end.

The coupler 10 comprises a tubular body member 27 and a pin member 28. The body member 27 includes an upper sub 29 having a right-hand threaded pin 30 which screws into the lower bore 26 of the coupling 25. Formed upwardly into the sub 29 is a blind bore 31 which is vented at its upper end by a vent hole 32 and is counterbored at its lower end and provided with right-hand threads 33. The tubular body member 27 also includes a hydraulic dashpot cylinder 34 having a cylindrical bore 35 which is of uniform diameter throughout its length and is provided at its upper end with an externally threaded extension 40 of reduced diameter which screws into the righthand threads 33 in the lower end of upper body sub 29.

The cylinder 34 has a bleed hole 41 which is normally closed by a threaded plug 42 and a hydraulic fluid filling hole 43 which is normally closed by a threaded plug 44. The lower end of cylinder 34 is turned down and provided with right-hand threads to form a threaded extension 45 which has an internal annular groove 46 just above its lower extremity for receiving a split-spring retaining ring 47.

The tubular body member 27 also includes a tubular cam housing 48 having the same outside diameter as sub 29 and cylinder 34 and having its upper end portion internally threaded to screw onto threaded extension 45 at the lower end of said cylinder. To facilitate the description of tubular cam housing 48 it will be referred to as comprising three sections, to wit: a lower or initial section 49, an intermediate or second section 50 and an upper or third section 55, the latter terminating at the lower end of the internal threads in the upper end portion of said housing.

The tubular housing 48 is provided at its lower end with two cam faces 56 each comprising a one-half turn of a right-hand helix, adjacent opposite ends of said helical faces being connected by vertical stop faces 57. A lower portion of the initial or lower section 49 of the housing 48 is provided with an internal bore 58 the upper end of which terminates at the lower ends of a pair of heavy internal bosses 59 which are integral with the tubular housing 48 and extend inwardly therefrom, said bosses being circumferentially spaced to provide a pair of splineways 60 outer surfaces of which are upward extensions of the bore 58. The internal bosses 59 terminate at the upper end of the initial section 49 of the tubular housing 48 and the second or intermediate section 50 of said housing starts at its lower end with a short counter bore 61 formed at the lower end of a bore 62 which extends from counter bore 61 to the upper end of second section 50 of said housing, the bore 62 being of the same diameter as bore 58. The second housing section 50 is provided with a diametrically opposed pair of axially aligned splineways 63. The third or upper section 55 of tubular cam housing 48 has a counter bore 64 which is coextensive with this section and has a diameter equal to the maximum diameter of the second housing section 50 which is measured from the bottom faces of the splineways 63.

Before the tubular cam housing 48 is screwed into the hydraulic dashpot cylinder 34, the following elements are assembled therein. A tubular cam sleeve 65 having a solid head 66 with an annular bead 70, and which is provided with two diametrically opposed external splines 71 which slidably fit within the splineways 63 while the sleeve 65 slidably fits the bore 62 and the bead 70 is slidable in counter bore 64, is inserted downwardly in the counter bore 64 until the bead 70 comes to rest on the internal shoulder formed at the juncture of bore 62 and the counter bore 64, as shown in FIG. 2b. When thus disposed the lower extremity of the cam sleeve 65 extends a slight distance into the short counter bore 61 at the lower end of the second housing section 50. Recesses are cut upwardly in the tubular cam sleeve 65 to produce two diametrically opposed locking recesses 73 one side edge 74 of each of said recesses having a steep left-hand helical pitch to form a cam face.

Occupying an upper portion of the bore 35 of hydraulic dashpot cylinder 34 so as to snugly fit said bore is a reservoir cylinder 75 the bore 76 of which provides a downward extension of the bore 31 of sub 29. Near its upper end, the cylinder 75 is externally grooved to receive an O-ring 76a for sealing off the space between cylinders 34 and 75. Compressed within the bores 31 and 76 is a light helical coiled expansion spring 77, and the lower end of this spring bears against a short reservoir piston 78 having an O-ring 79 and which is slidably disposed in the lower end of reservoir cylinder 75. The lower end of cylinder 75 is provided with notches 80, the purpose of which will be made clear hereinafter.

Slidably fitting in the cylinder 35 against the lower end of the cylinder 75 is a cylindrical orifice block 85 having a check valve 86 mounted axially therein, the ball 87 of which checks an upward flow of fluid through said valve but permits a free downward flow therethrough. Slidably disposed in the lower end of cylinder 34 is a dashpot piston 88 having a downward extension 89 of reduced diameter which extends downwardly through the split ring 47, the latter acting as a stop limiting downward movement of the piston 88 in the cylinder 34. The piston 88 is externally grooved to receive an O-ring 88a which forms a fluid tight seal between said piston and the bore 35 of cylinder 34. The block 85 and piston 88 have axial bosses 90 and 91 which operate to centralize a heavy coiled expansion spring 92 which is disposed within the cylinder 34 and tightly compressed between block 85 and piston 88 so as to hold said block tightly pressed against reservoir cylinder 75 and to bias dashpot piston 88 downwardly against split ring 47. When the rod coupler 10 is assembled, and the tubular cam housing 48 is screwed onto the lower end of dashpot cylinder 34, as shown in FIG. 2, the split ring 47 is preferably relieved of the pressure thereagainst of spring 92, by engagement of the piston extension 89 with the solid head 66 of tubular cam sleeve 65 while the annular bead 70 of said sleeve rests solidly downwardly on the shoulder 72 provided in the tubular cam housing 48 at the juncture of bores 62 and 64.

The pin member 28 of rod coupler 10 includes a lower cam sub 100 which is cylindrical with the same outside diameter as cylinder 34 and has a threaded pin 101 extending downwardly therefrom which screws into the right-hand threaded receptacle 14 of rod coupling 13. The sub 100 is shaped to produce thereon two lower helical cam faces 102 each of which extends one-half turn about said sub, adjacent opposite ends of said helical faces being united by vertical cam sub stop faces 103. The helical cam faces 102 have a right-hand pitch, and are formed about a short cylindrical pin base 104 having an external diameter permitting said base to slidably fit within the short bore 58 provided in the lower extremity of tubular cam housing 48. The helical cams 102 are of the same pitch as upper helical cams 56 formed on the lower end of tubular cam housing 48 and the upper and lower cams may be brought into sliding abutting relation when cylindrical pin base 104 is received in the lower end of tubular cam housing 48 as above noted.

Extending axially upwardly from pin base 104 is a cylindrical pin 105 which is of a reduced diameter so as to be slidably received in concentric arcuate channels 106 formed in internal bosses 59 provided in the lower section 49 of tubular cam housing 48. Formed integrally with said pin to extend laterally in diametrically opposed relation from an upper portion thereof is a pair of like cam lugs 107 having concentric outer faces adapting them to slidably fit within the short bore 58, within splineways 60 and within bore 62 of the tubular cam housing 48. These lugs are equally spaced circumferentially and their maximum circumferential dimension is such that they slidably fit within the splineways 60 when the pin member 28 is oriented relative to the tubular body member 27 as shown in FIG. 2b. It is to be noted that the lugs 107 have flat horizontal bottom faces 108 which lie in a common plane and each such lug has a vertical left side face 109 which extends practically the full length of the lug, a short vertical right side face 110, a cam face 115 having a lefthand pitch of approximately the same angle as that with which cam faces 74 of cam sleeve 65 are pitched, the cam face 115 of each lug extending upwardly from the upper end of the short vertical right side face 110 thereof and merging with a rounded surface 116 of small radius which unites the cam face 115 with the upper end of the long vertical left side face 109 of said lug.

Operation

For simplification of the drawings, the details of the environment within which the invention is employed in connecting a sucker rod string to the plunger of a deep well pump, are omitted. It is to be understood however, that the purpose of the invention, in the use of the same illustrated herein, is to permit the pump (including its plunger) to be introduced into the well suspended from the lower end of a string of pump tubing, and then, after this has been completed, to assemble the sucker rod string 11 as this is inserted down the tubing, the invention providing a means for connecting the lower end of the sucker rod string with the plunger of the pump at the conclusion of the assembly of the sucker rod string.

To effect this purpose, the pin member 28 of the rod coupler 10 is assembled on the pump and introduced into the well with the latter. The tubular body member 27, carrying the parts enclosed therein, is then connected to the lower end of the lowermost sucker rod of the rod string 11 so that the completion of the assembly of the rod string results in the tubular body member 27 of the coupler approaching the pin member 28 thereof approximately as shown in FIG. 1. Any suitable guide means may be provided, if necessary, to assure a coaxial relationship between the tubular body member 27 of the coupler and the pin member 28 thereof so that a further lowering of the sucker rod string 11 causes the lower end of the tubular cam housing 48 to slidably receive the upper end of the pin member 28 as shown in FIG. 2b. The rounded upper end faces 116 of the lugs 107 cause these lugs to readily find their way into splineways 60 if they are not already aligned with said splineways when contact is first made between members 27 and 28. FIG. 2b shows said lugs already aligned with said splineways just to simplify the illustration.

The next operational views in the drawings, FIGS. 3 and 6, show the upper rounded ends 116 of the lugs 107 in contact with lower end portions of cam faces 74 of the tubular cam sleeve 65 so that relative vertical movement between the tubular body member 27 of the rod coupler 10 and the pin member 28 thereof causes downward movement of the tubular cam sleeve 65 to be halted so that further downward movement of the sucker rod string 11 and the tubular body member 27 connected therewith can only occur coincidentally with a compression of the dashpot expansion spring 92, and a discharge of operating fluid from the compression chamber 117. The check valve 86 being always closed against any escape through this valve of fluid from said chamber, the only avenue for such escape is through the annular space only about two thousandths of an inch wide between orifice block 85 and the bore 35 in which this reposes, and through the notches 80 formed in the lower end of reservoir cylinder 75 and into the reservoir chamber 118 provided in the bore 76 of cylinder 75 between orifice block 85 and reservoir piston 78.

The outer surface of the orifice block 85 is machined and polished in its manufacture so as to give the annular orifice 119 formed by the space between this block and bore 35 precisely that predetermined capacity for allowing fluid to escape from the dashpot compression chamber 117 into the reservoir chamber 118 which will retard the performance of the connecting function of the coupler 10 for just that period of time which will provide security against any accidental uncoupling of the coupler 10.

A high degree of torque tending to cause relative rotation between tubular body member 27 and pin member 28 of rod coupler 10 is produced by the vertical pressure with which lower portions of the cam faces 74 engage the curved upper ends 116 of cam lugs 107 while the tubular body member 27 is being forced downwardly by the weight of sucker rod string 11 onto the pin member 28 as shown in FIGS. 3b and 6. However, as long as lugs 107 remain in splineways 60, relative rotation between the members 27 and 28 of rod coupler 10 is prevented. As soon as the downward movement of member 27 moves the internal bosses 59 below the lower ends of lugs 107, the torque above referred to, as being set up by engagement of cam faces 74 by curved upper ends 116 of lugs 107, produces a rapid rotation between members 27 and 28 which is caused by spring 92 forcing the dashpot piston 88 and tubular cam sleeve 65 downwardly as shown in FIG. 7b. This relative rotation starts with the helical cam faces 56 and 102 very closely spaced apart vertically and with the vertical stop faces 57 and 103 also close together, and the relative rotation covers an angle of about 100° and culminates with the cam lugs 107 deeply penetrating the locking recesses 73 in the tubular cam sleeve 65 with the lug cam faces 115 still in pressurable contact with the cam faces 74 of cam sleeve 65 and with long vertical left side faces 109 of lugs 107 in spaced relation with vertical side edges 73a of locking recesses 73 of said cam sleeve, and, finally, with the vertical stop faces 57 and 103 swung apart by an angle of approximately 100°, and with upper and lower helical cam faces 56 and 102 jammed tightly against each other as shown in FIG. 7b.

While the dashpot 120 of the invention powerfully retarded the relative axial movement between the tubular body member 27 and pin member 28 of the rod coupler 10 in order to couple these two members together as above described, this dashpot did not materially retard the expansion of spring 92 to effect the relative rotation between members 27 and 28 which brought about the union of these two members as shown in FIG. 7. This is because, at the moment the body member 27 had moved downwardly to the point above described where the internal bosses 59 move downward out of engagement with cam lugs 107, these lugs no longer supported the tubular cam sleeve 65 by the engagement of their upper ends with cam faces 74 as shown in FIG. 6, but were free to yield away from said cam faces, and, inasmuch as sucker rod string 11 is supported for free rotation while it is being lowered to effect a union of the coupler 10, the downward pressure of spring 92 immediately starts the relative rotation betwen coupler members 27 and 28 as above described. In consequence, the liquid pressure in dashpot compression chamber 117 drops to a value far below the fluid pressure prevailing in reservoir chamber 118, whereupon check valve 86 opens in response to this pressure differential allowing operating liquid to flow rapidly downwardly through this check valve from reservoir chamber 118 into dashpot chamber 117 as shown in FIG. 7a.

It may be observed in FIG. 7b, that, at the conclusion of the automatic functioning of rod coupler 10 to produce a union of the tubular body member 27 and pin member 28 thereof, the downward movement of the tubular cam sleeve 65 is halted by the engagement of its cam faces 74 with the cam faces 115 of cam lugs 107 with the annular external bead 70 of said cam sleeve suspended a substantial distance above and out of contact with internal shoulder 72 of the tubular cam housing 48 upon which said bead rests when members 27 and 28 are disconnected as shown in FIG. 2. This causes the dashpot piston 88 to be held spaced upwardly a substantial distance from split retaining ring 47.

From the above explanation, it becomes clear that the union of the members 27 and 28 of rod coupler 10, as shown in FIG. 7, concludes with said members locked against any endwise play whatever as well as being locked against relative rotation, in the absence of the application to one of said members (while the other member is held against rotation) of a high clockwise torque force for a substantial period of time.

The rod coupler 10 is designed to be readily disconnected wherever desired by the application of such a torque force for such a period of time to the sucker rod string 11 at the top of the well after this string has been lowered to cause the rod coupling 13 to rest downwardly on the rod valve guide 16 whereby clutch lugs 15 fit into clutch notches 17 and thus prevent rotation of the pin member 28 of the rod coupler 10. The factor which determines the length of time that such a torque force must be applied to the sucker rod string 11 to effect a separation of the coupler, is the capacity of the annular orifice 119 comprising the space between the orifice block 85 and the bore 35 to allow operating fluid to escape from dashpot compression chamber 117 into the reservoir chamber 118. In practice this orifice is so designed that the dashpot 120 retards a transfer of operating fluid from chamber 117 to chamber 118 for about 30 seconds when a torque force as high as practical within the limits of safety is applied to the upper end of the sucker rod string 11. This torque force is of course applied in a clockwise direction to the upper end of said sucker rod string so as tend to tighten all of the threaded joints in the string and in the coupler 10. The pitch of cam faces 74 and 115 however is in a left-hand direction and the application of torque to tubular body member 27 of the coupler 10 produces an axial upward resultant force at diametrically opposed points on the tubular cam sleeve 65 which presses this sleeve upwardly against the downward extension 89 of the dashpot piston 88 which is sufficient to force this piston upwardly in the bore 35 so as not only to compress the spring 92 but to raise the pressure of the liquid occupying dashpot compression chamber 117 to the point where it will be discharged through the annular orifice 119 into reservoir chamber 118 within a predetermined period which, as above stated, is preferably about 30 seconds.

As the tubular cam sleeve 65 is thus gradually moved upwardly by the clockwise rotation of tubular body member 27 relative to pin member 28, this rotation between said members gradually returns the cam lugs 107 into vertical alignment with splineways 60 located between internal bosses 59. Towards the end of the 30 second period during which torque is applied to the sucker rod string 11 for disconnecting the rod coupler 10, a light upward strain is applied to the rod string so that when the member 27 has been rotated about 100° relative to the pin member 28 so as to bring the vertical stop faces 57 into contact with the vertical stop faces 103 on the lower cam sub 100, which means that the lugs 107 are now in alignment with splineways 60, the existing upward tension placed on the tubular body member 25 will lift this axially relative to pin member 28 causing the splineways 60 to slide upward over the lugs 107 thereby positively preventing further rotation between members 27 and 28. Vertical stop faces 57 then move upwardly out of engagement with vertical stop faces 103 and the continued lifting on the sucker rod string will now completely vertically separate the tubular body member 27 from the pin member 28 as these members are shown in FIG. 1.

The axial separation of coupler members 27 and 28 takes place in a fraction of a second after the splineways 60 have been brought into vertical alignment with the cam lugs 107 which, as above noted, simultaneously brings vertical stop faces 57 into engagement with the stop faces 103 on the lower cam sub 100. This separation of members 27 and 28 leaves tubular cam sleeve 65 without any support from the pin member 28 and allows this sleeve to drop immediately to its lowermost position in which it is supported by its annular bead 70 on internal shoulder 72. The dashpot piston 88 follows the tubular cam sleeve 65 downwardly to its lowermost position just at fast as the operating fluid can flow through the check valve 86 to restore equilibrium between the fluid pressures in the dashpot compression chamber 117 and the reservoir chamber 118. This restoration of the parts embodied in the tubular body member 27 of the rod coupler 10 to their normal starting relationship as shown in FIG. 2 takes place almost immediately upon the separation of the member 27 from the member 28. Thus the rod coupler 10 could be reconnected immediately after it has been disconnected, should this be desired.

It is possible for the rod coupler 10 to function while the dashpot 120 is dismantled by removing check valve 86 from orifice block 85 or simply by draining the operating fluid from the chambers 117 and 118. The resulting mode of operation of rod coupler 10 would permit the disconnection of the coupler much more rapidly than is possible when the dashpot 120 of the coupler is operative, and it is within the scope of the present invention to utilize this modified mode of operation wherever no purpose is served by requiring that a high torque be applied to the sucker rod string for a substantial period of time in order to disconnect the coupler.

While only a single preferred embodiment of the invention is disclosed herein, it is to be understood that various changes and modifications may be made in this without departing from the spirit of the invention or the scope of the appended claims.

I claim:

1. In a device for coupling primary and secondary axially aligned rod elements, the combination of: a cylindrical coupler pin provided axially on said primary elements; a tubular coupler body provided axially on said secondary element; a plurality of like locking lugs extending radially from said pin, said lugs being equally spaced from each other, said body having an initial section through which said pin and lugs are slidable, said section being provided with internal bosses separated by splineways, said splineways slidably receiving said lugs whereby the latter may bypass said bosses, said body also having a second section with a cylindrical bore the diameter of which exceeds the outside diameter of said pin and lugs whereby said pin may be extended through said initial section to position said lugs entirely in said cylindrical bore and said pin then rotated to bring said lugs opposite said internal bosses; a cam sleeve axially slidable within said bore and having external splined relation with said second body section, said sleeve being shaped to provide like cam faces equal in number to said lugs, said sleeve slidably receiving said pin to bring said lugs into camming engagement respectively with said cam faces; and spring means in said body biasing said sleeve towards said first body section, said engagement between said lugs and said cam faces shifting said sleeve further into said second body section and compressing said spring means, and producing a substantial torque tending to rotate said body relative to said pin, until said lugs pass entirely into said second body section, whereupon said spring means shifts said sleeve towards said pin and, by the torque produced by the cam action of said sleeve on said lugs, rotates said body relative to said pin to position said lugs opposite said bosses and, in conclusion, locks the pin against rotation relative to said body with said lugs so positioned.

2. A combination as recited in claim 1 wherein cam means are provided on the extremity of said body and on said coupler pin which force said lugs into snug engagement with said bosses at the conclusion of the spring actuated axial movement of said sleeve and provides a stop terminating the resultant rotation of said body relative to said pin.

3. A combination as recited in claim 2 wherein said cam means comprise a cylindrical base for said pin integrally united therewith and of the same diameter as said coupler body, there being matching helical cam faces provided respectively on meeting ends of said base and said body and axial abutting faces joining opposite ends of said cam faces, the pitch of said matching helical cam faces being in the opposite direction from that of said sleeve cam faces.

4. A combination as recited in claim 1 wherein said sleeve cam faces remain in contact with said lugs at such helical angles when said lugs are interlocked with said bosses that by application of a relatively high torque in a given direction to one of said elements while the other element is held against rotation, axial translation of said sleeve away from locking relation with said lugs will be produced in opposition to said spring means whereby said lugs are returned to alignment with said splineways and said body and pin may be readily separated axially.

5. A combination as recited in claim 4 wherein hydraulic dashpot means is provided in said coupler body and functions coaxially therewith between said sleeve and said body to substantially retard the rate at which translation of said sleeve takes place in response to the application of torque to one of said elements as aforesaid.

6. A combination as recited in claim 5 wherein said dashpot means includes a pressure cylinder one end of which is adjacent said sleeve and a reservoir cylinder at the other end of said pressure cylinder; a pressure piston sliding with a fluid tight fit in said one end of said pressure cylinder and engaging said sleeve; fixed orifice block means separating said cylinders and allowing a highly retarded escape of operating liquid from said pressure cylinder to said reservoir cylinder; a reservoir piston sliding with a fluid tight fit in said reservoir cylinder; a check valve in said block checking a flow of liquid from said pressure cylinder into said reservoir cylinder but permitting a relatively free return flow; and a reservoir spring in said reservoir cylinder biasing said reservoir piston toward said block, said sleeve spring means being compressed between said block and said pressure piston to bias the latter against said cam sleeve.

7. In a device for coupling axially aligned rod elements, the combination of: a tubular coupling member; a pin coupling member; interlocking means on said members which slidably admit said pin member into said tubular member, when the two members are aligned, and prevents relative rotation between said members until said pin member has been inserted a pre-determined distance into said tubular member, whereupon said relative rotation is permitted by said means and results in said means interlocking said members against separation axially; compressible torque producing means provided within said tubular member and engageable by said pin member during said relative axial movement between said members to compress said torque producing means, said means functioning to produce relative rotation between said members thus causing said interlocking means to couple said members together, said torque producing means also resisting relative rotation between said members, after said members are thus interlocked, thereby retaining said members in coupled relation, said torque producing means comprising an axially spring-urged helical cam having an axially splined relation with said tubular member, and wherein engagement of said cam with said pin member applies torque to the latter causing the same to rotate to and remain in its interlocking relation within said tubular member, upon its having been inserted the required distance axially into said tubular member, said torque producing means yieldably retarding a reverse relative rotation between said members which is requisite before the latter may be uncoupled; and dashpot means provided on said tubular member and coacting between said tubular member and said pin member, the retarding action of which dashpot means is added to that applied by said torque applying means in resisting the relative rotation between said members requisite for uncoupling the latter.

8. A rod coupler as recited in claim 7 wherein said dashpot means includes a dashpot cylinder, a piston in said cylinder bearing axially against said helical cam, said cam spring means being compressed in said cylinder behind said piston, said cylinder having a valved inlet freely admitting liquid to said cylinder and a piston retarding discharge passage permitting a relatively slow discharge of liquid from said cylinder.

9. A rod coupler as recited in claim 8 wherein said dashpot means includes a reservoir sleeve and a valve block positioned consecutively in said cylinder with said piston and spring; a seal between said sleeve and said cylinder; and a reservoir piston and spring in said sleeve compressing liquid therein to force the same through said valve into said cylinder, there being a bypass from said cylinder into said sleeve adjacent said block, and a pressure relief passage connecting the opposite end of said sleeve to the exterior of said tubular member.

References Cited by the Examiner

UNITED STATES PATENTS

| | | | |
|---|---|---|---|
| 1,645,428 | 10/1927 | Hosmer. | |
| 1,804,700 | 5/1931 | Maxwell | 175—297 |
| 1,837,639 | 12/1931 | Wickersham. | |
| 2,066,956 | 1/1937 | Williams. | |
| 2,172,602 | 9/1939 | Williams | 285—391 X |
| 2,202,260 | 5/1940 | Osmun. | |
| 2,671,682 | 3/1954 | Page | 287—119 X |
| 3,168,340 | 2/1965 | Howard | 285—84 X |

FOREIGN PATENTS

| | | |
|---|---|---|
| 4,598 | 2/1909 | Great Britain. |

CARL W. TOMLIN, *Primary Examiner.*